United States Patent [19]

Cummings

[11] Patent Number: 4,664,341
[45] Date of Patent: May 12, 1987

[54] HEAD RESTRAINT SYSTEM

[75] Inventor: Robert J. Cummings, Hermosa Beach, Calif.

[73] Assignee: Rockwell International Corporation, El Segundo, Calif.

[21] Appl. No.: 647,294

[22] Filed: Sep. 4, 1984

[51] Int. Cl.⁴ .............................................. B64D 25/06
[52] U.S. Cl. .............................. 244/122 AG; 297/464; 280/801; 128/133
[58] Field of Search ............ 244/122 AG, 122 B, 121; 297/464, 465, 466, 468, 391, 486, 216; 280/748, 801, 808; 269/328; 128/133, 134

[56] References Cited

U.S. PATENT DOCUMENTS

| | | | |
|---|---|---|---|
| 3,099,261 | 7/1963 | Doss et al. | 244/122 B |
| 3,170,659 | 2/1965 | Wood, Jr. | 244/122 B |
| 3,376,064 | 4/1968 | Jackson | 297/391 |
| 3,922,034 | 11/1975 | Eggert | 297/391 |

FOREIGN PATENT DOCUMENTS 656079  8/1951  United Kingdom ............ 244/122 B
978422 12/1964  United Kingdom ........ 244/122 AG Primary Examiner—Galen Barefoot
Attorney, Agent, or Firm—Charles T. Silberberg

[57] ABSTRACT

A head restraint system is disclosed that is designed to protect the pilot's head against severe lateral forces. A circular track surrounds and is affixed to the pilot's helmet. The track is attached by two cables to a seat back. During normal flight conditions, the cables provide a small but constant tension to the helmet, and allow the pilot's head free movement in all directions. A spring loaded inertia reel will lock the cables in place when the lateral forces exceed a predetermined level. The system will also provide afterward head support during the pilot's emergency ejection from the aircraft, and the cables are automatically severed when the pilot is separated from the seat.

20 Claims, 8 Drawing Figures

HEAD RESTRAINT SYSTEM

BACKGROUND OF THE INVENTION

The invention involves a pilot head restraint system that provides the pilot protection against severe lateral forces, but allows free movement of the pilot's head during normal flight conditions.

Modern high performance fighter aircraft are capable of sophisticated light maneuvers, including tight turning and rapid acceleration, which enable the aircraft to evade enemy missiles and rockets. However, this improved aircraft maneuverability is counterproductive if the resulting forces imposed on the unprotected pilot are beyond human tolerances. One can only speculate as to the number of fighter aircraft lost as a result of pilot blackout.

There already exist several designs, which are not effective for this purpose because of design limitations. U.S. Pat. No. 2,638,293 discloses a sophisticated head restraint system, wherein the helmet is connected to five inertia reels, which are each attached to a pulley system located behind the pilot. During any violent aircraft maneuvers, the head of the pilot is firmly restrained against the headrest. However, in this position the pilot has limited peripheral vision, and a diminished view of the instrument panel. In a combat mission, a pilot must be able to move his head quickly in any direction. Such free movement cannot be accommodated by this system. U.S. Pat. No. 4,004,763 discloses another head restraint system that requires the pilot's head to be restrained in the reclining position, which again limits head movement and pilot vision.

A head restraint system is needed that will enable free and unencumbered head movement during periods of tolerable lateral inertia forces, while locking in place and protecting the pilot's head during periods of high lateral inertia forces.

SUMMARY

It is an object of the present invention to restrain the movement of pilot's head when the lateral acceleration field exceeds a predetermined level, and allow freedom of movement (forward or backward, to either side, upward or downward, or any combination) during all other flight conditions.

It is another object of the present invention to protect the pilot's head from lateral inertia forces even when the pilot is not reclining in the seat.

It is still another object of the present invention to protect the head of the pilot during emergency ejection from the aircraft.

The system is specifically designed to provide head support from severe lateral inertia forces. Other head support systems compatible with the present invention must be employed to protect the head from direct forces caused by acceleration and deceleration forces. Also, special compatible systems must be used to protect the body.

The invention is a head restraint system for an aircraft crewmember, generally a pilot, that will protect the head from high forces caused by sudden lateral shifts of the aircraft. The system includes a helmet located within a track, a seat back, and means to attach the track to the seat back.

Generally, the attaching means consists of two cables. Each cable is attached to a spring-loaded, inertia reel which will pay-out or take-up cable and maintain a small but constant tension when the lateral inertia forces are below a predetermined level. However, when the predetermined level is exceeded, the reels lock against the cables' pay-out.

In the preferred embodiment two lateral posts are used, one on each side of the head, to determine the angle that each cable is attached to the track. Since the system is designed to protect against lateral inertia forces, the cables must provide lateral and balanced tension to the sides of the pilot's head. Since lateral forces are applied from the side, protection against these forces, must constrain the head from lateral movement. This balanced tension is achieved as the two cables remain in substantial alignment with the mass center of the pilot's head. Since only two cables protect the pilot's head against lateral inertia forces, alignment through the mass center is an effective way of balancing the tension.

The cables are affixed to the track by frictionless members that slide along the track as the pilot's head moves. The circular track is freely attached to the helmet to allow the helmet to move relative to the track. When the head is pivoted upward, the cables will prevent the track from interfering with the pilot's vision. When the head is pivoted downward, the cables will release the track and the track will move with the pilot's head.

During the pilot's emergency ejection from the aircraft, pins on the lateral posts are automatically pulled so that the cables can provide afterward support to the pilot's head. After ejection deceleration and during the pilot's separation from the seat, the cables are automatically severed.

The novel features which are believed to be characteristic of the invention as to the system together with further objects and advantages thereof, will be better understood from the following description in connection with the accompanying drawings in which the presently preferred embodiments of the invention is illustrated by way of example. It is to be expressly understood, however, that the drawings are for purposes of illustration and description only, and are not intended as a definition of the limits of the invention.

DETAILED DESCRIPTION OF THE INVENTION

Figure 1:
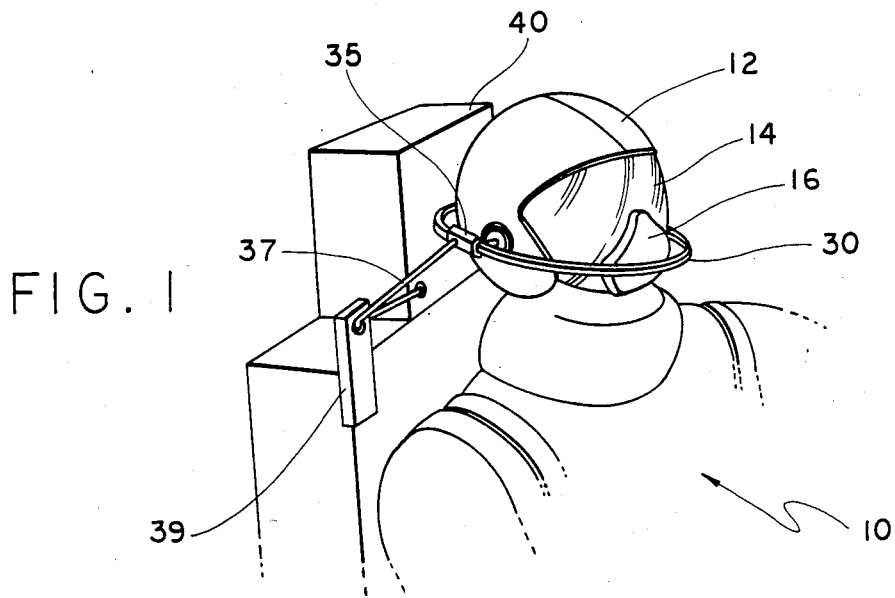
FIG. 1 illustrates a fragmented perspective view of the pilot, the seat, and the head restraint system according to the present invention.

Referring now to the drawings, FIG. 1 illustrates a pilot 10 along with the head restraint system of the present invention. Pilot 10 is wearing helmet 12 complete with eye shield 14 and face mask 16.

Encircling helmet 12 is circular track 30 that is mounted to helmet 12 by connecting rods 32 and 33 at ear guards 18 and 19. Ear guards 18 and 19 are located near the center of gravity of pilot's head.

Figure 2A:
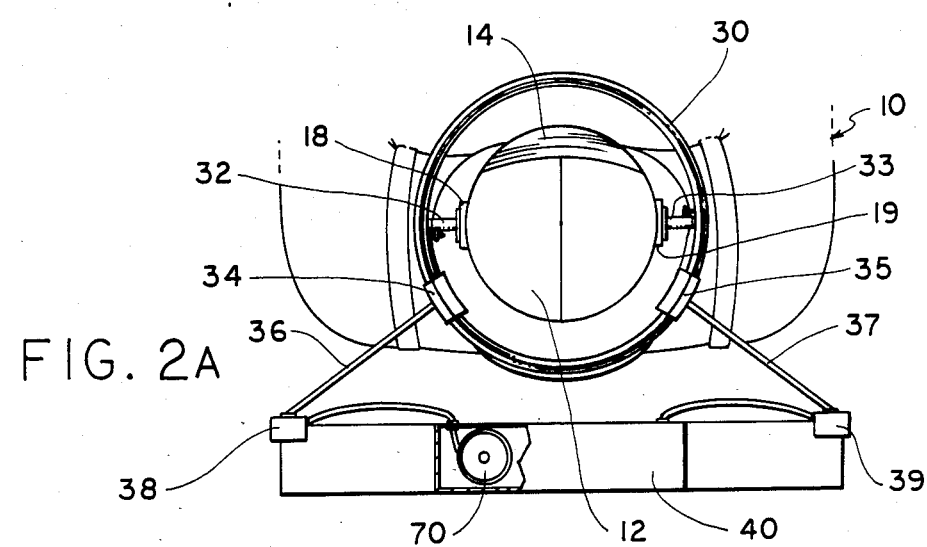
FIG. 2A illustrates a top view of the head restraint system with the pilot looking straight ahead.
Figure 2B:
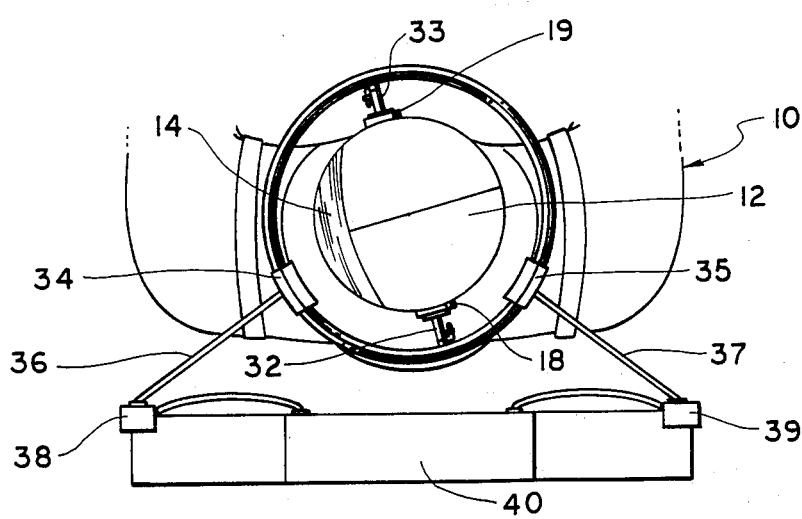
FIG. 2B illustrates a top view similar to FIG. 2A of the head restraint system with the pilot's head turned to one side.
Figure 4:
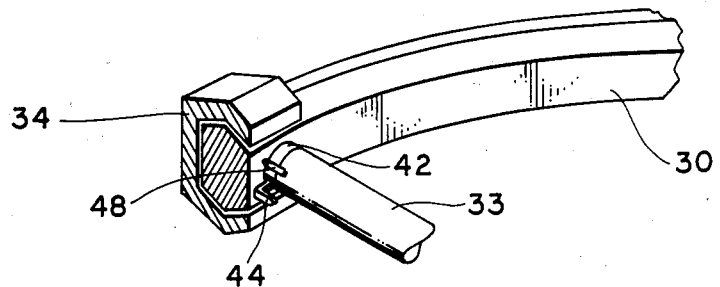
FIG. 4 illustrates a detail of a fragmentary perspective of the track.

To allow freedom of movement of pilot's head to either side as shown in FIG. 2A and FIG. 2B, track sleeves 34 and 35 slide along track 30. Circular track 30 may have a hexagonal cross-section as shown in FIG. 4. Track sleeves 34 and 35 preferably cover five of the six sides of track 30 and rods 32 and 33 are rigidly mounted on the sixth side to avoid entanglement during head rotation. Track sleeves 34 and 35 are located on either side of and behind the pilot's head. FIG. 2A shows the position of connecting rods 32 and 33, and track sleeves 34 and 35, as the pilot is looking straight ahead. FIG. 2B shows the position of connecting rods 32 and 33, and track sleeves 34 and 35, as the pilot is turned to the left side. Track sleeve 34 is affixed to cable 36 and track sleeve 35 is affixed to cable 37, which are both attached to seat back 40 through lateral posts 38 and 39. Lateral posts 38 and 39 are used to provide lateral tension to the pilot's head through track sleeves 34 and 35, and through cables 36 and 37, respectively. The direction of the lateral tension is determined by the position of the pilot's head relative to posts 38 and 39.

Within seat back 40 is located a spring-loaded, inertia reel 70, which during low lateral inertia forces will pay-out or take-up cable to provide a constant cable tension as pilot's head moves forward or backward, upward or downward, or to either side. When the lateral acceleration field exceeds a preselected level, reels 70 lock against cable pay-out. This provides balanced lateral locking tension to the helmet and thereby protects the head against lateral violent head movements induced by inertia forces. Lateral posts 38 and 39 determine the angles of cables 36 and 37 relative to the pilot and seat back 40, which in turn determine the direction of the balanced opposing forces. The locking occurs regardless of head position. The cable system remains in substantial alignment with the mass center of the crewmember's head at all times. Although the system works best for lateral inertia forces when the head is located near seat back 40, it will provide balanced lateral head support in all positions.

Figure 3A:
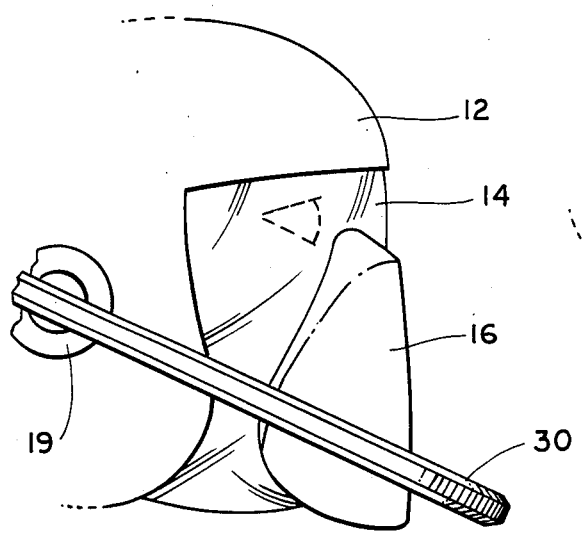
FIG. 3A illustrates a profile view of the helmet and the track in its normal position as the pilot is looking straight ahead.
Figure 3B:
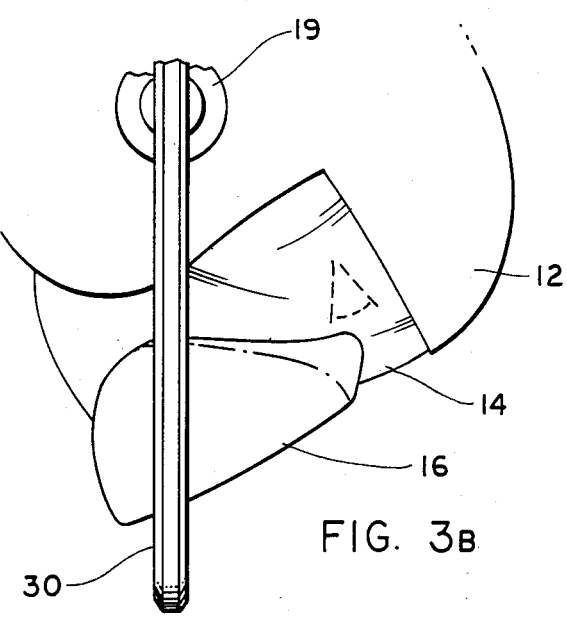
FIG. 3B illustrates a profile view of the helmet and the track position similar to FIG. 3A as the pilot is looking downward.
Figure 3C:
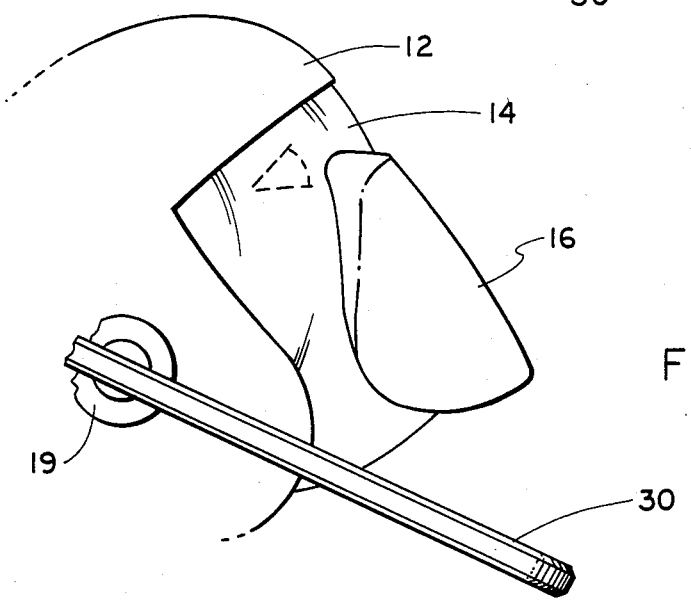
FIG. 3C illustrates a profile view of the head and the track position similar to FIGS. 3A and 3B as the pilot is looking upward.

To provide freedom of movement when the pilot's head moves forward and backward as shown in FIG. 3A, FIG. 3B, and FIG. 3C without obstructing the pilot's vision, track 30 must pivot relative to helmet 12. FIG. 3A shows the pilot's head in its normal position, upright with pilot looking straight ahead. Track 30 is positioned at about chin level. FIG. 3B shows the head leaning forward and looking downward. Track 30 has moved with helmet 12 and is still about chin level. FIG. 3C shows pilot's head leaning backward with pilot looking upward. In this position track 30 will not may obstruct pilot's vision (His eyes can look upward or downward without obstruction). In this position, a stop prevents track 30 from moving with helmet 12.

Figure 5:
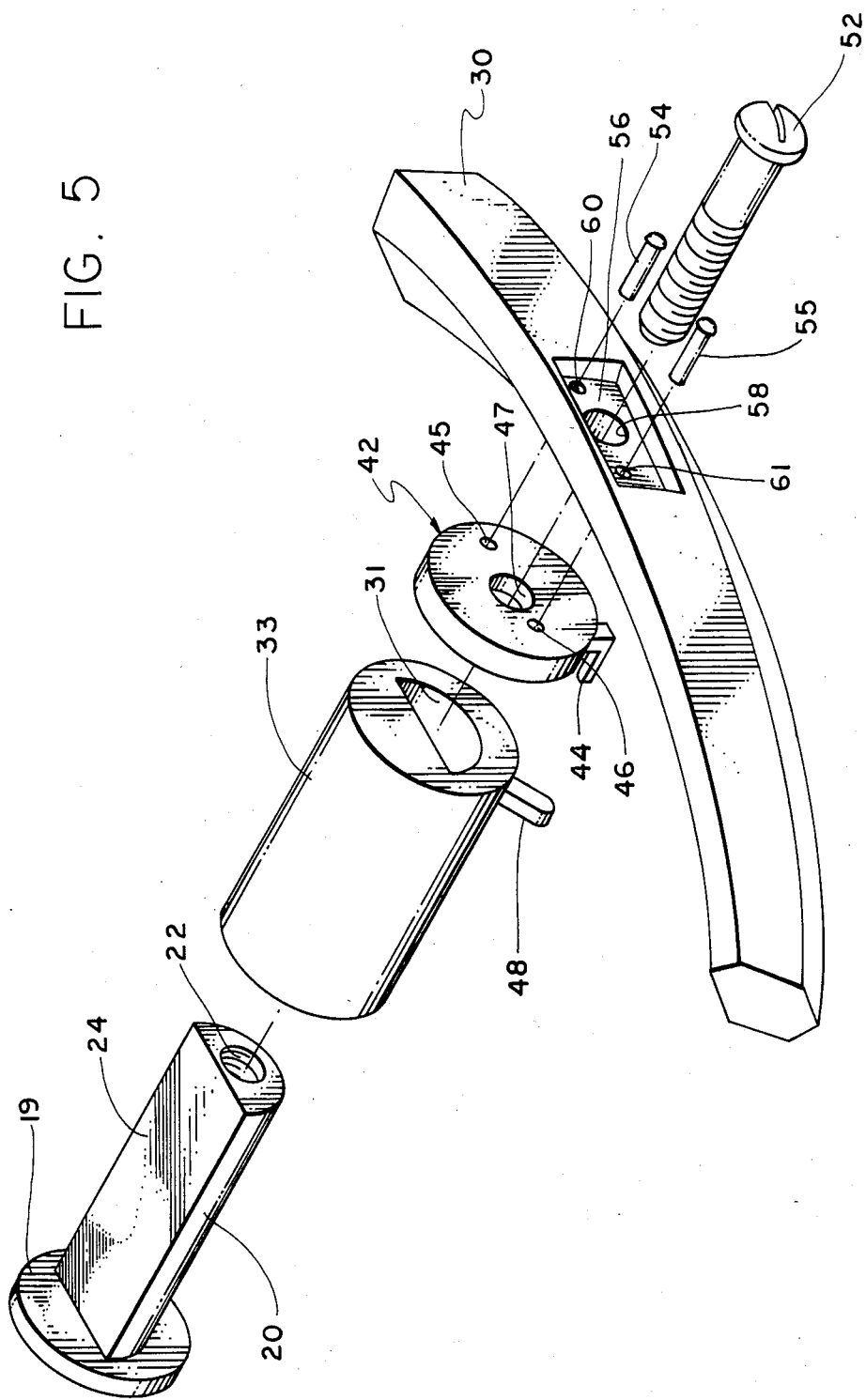
FIG. 5 illustrates an exploded assembly drawing of one of the rods.

FIG. 5 depicts a preferred apparatus which allows movement of track 30 relative to helmet 12 under certain conditions (shown in FIG. 3C). Track recess 56 located within track 30 enables clearance of bolt 52, and fasteners 54 and 55, with track sleeves 34 and 35. Threaded rod bolt 52 attaches track 30 to cylindrical bar 20. Threaded fasteners 54 and 55 attach track 30 through fastener holes 60 and 61, and to tabbed washer 42, through threaded fastener holes 45 and 46. Washer 42 has a tab 44 bent away from track 30. Ear guard 19 is rigidly attached to cylindrical bar 20 which has a flat portion 24. Bar 20 has a threaded hole 22 therein to accept threaded bolt 52. Cylindrical rod 33 has rod hole 31, allowing bar 20 to fit snugly into rod 33. The shape of hole 31 prevents rotation of rod 33 relative to bar 20. On the outer surface of rod 33 is tab stop 48, which may be used to limit the position of tab 44 during upward movements of helmet 12, that is, track 30 remains stationary (See FIG. 3C). Bolt 52 fits through track bolt hole 58, a washer bolt hole 47, rod hole 31, and is threaded into hole 22 in bar 20. Track hole 58 and washer hole 47 are larger than the shaft of bolt 52 to enable free movement of bolt 52 relative to track 30 and washer 42.

Upon emergency ejection from the aircraft lateral posts 38 and 39 may be pin released so that cables 36 and 37 are pulled tight to provide afterward head support against seat back 40. It is after emergency ejection from the aircraft that the pilot is separated from the seat. Prior to separation but after ejection a pyrotechnic cutter (not shown) will automatically sever cables 36 and 37.

Accordingly, there has been provided, in accordance with the invention, a head restraint system that fully satisfies the objectives set forth above. It is understood that all terms used herein are descriptive rather than limiting. While the invention has been described in conjunction with specific embodiments, it is evident that many alternatives, modifications, and variations will be apparent to those skilled in the art in light of the disclosure herein. Accordingly, it is intended to include all such alternatives, modifications, and variations that fall within the spirit and scope of the appended claims.

I claim:

1. A head restraint system that protects the head of a crewmember from lateral inertia forces, while said crewmember is in a seat within an aircraft, which comprises:
   a helmet worn on said head of said crewmember;
   a track attached to said helmet, said track surrounding said helmet;
   a seat back located behind said crewmember; and
   attaching means for attaching said seat back to said track, said means allowing free movement of said helmet relative to said seat back whenever said lateral inertia forces are below a predetermined level, and said means restraining lateral movement whenever said lateral inertia forces exceed said predetermined level.

2. The system of claim 1, wherein said attaching means comprises two cables, wherein additional cable length between said track and said seat back is provided on demand during periods when said lateral inertia forces are below said predetermined level, and said cables lock in place during periods when said lateral inertia forces exceed said predetermined level.

3. The system of claim 2, wherein said two cables provide balanced tension whenever said cables lock in place.

4. The system of claim 3, wherein said balanced tension is provided on opposite sides of said track.

5. The system of claim 1, wherein said attaching means remains in substantial alignment with the mass center of said helmet.

6. The system of claim 2, further comprising two lateral posts mounted to said seat back, one post for each cable, each post having one slot therein for mounting each of said cables.

7. The system of claim 1, further comprising means attached to said track that allows relative movement of said track to said helmet when said helmet faces upward.

8. The system of claim 7, wherein said lateral posts are released from said seat as said crewmember is ejected from said aircraft.

9. The system of claim 2, wherein said attaching means disconnect as said crewmember is separated from said seat after emergency ejection of said crewmember from said aircraft.

10. The system of claim 6, wherein said two cables provide balanced tension whenever said cables lock in place.

11. The system of claim 10, further comprising means attached to said track that allows relative movement of said track to said helmet when said helmet faces upward.

12. The system of claim 11, wherein said lateral posts are released from said seat as said crewmember is ejected from said aircraft.

13. The system of claim 12, wherein said attaching means disconnect as said crewmember is separated from said seat after emergency ejection of said crewmember from said aircraft.

14. An apparatus that provides lateral head support to the head of a crewmember while in an aircraft from lateral inertia forces, which comprises:
   a helmet worn on said head;
   attaching means to laterally attach said helmet at attachment points thereon to said aircraft at locations in said aircraft behind the crewmember, said locations and said attachment points being in substantial alignment with the mass center of said head; and
   movement means that allow free movement of said head whenever said forces do not exceed a predetermined level, but which constrains said head by applying balanced lateral tension whenever said forces exceed said predetermined level.

15. The apparatus of claim 14, wheren said attaching means includes two cables, one cable being on each side of said helmet.

16. The apparatus of claim 15, wherein said movement means includes two spring loaded inertia reels, one reel connected to each cable, each of said reels being able to pay-out and take-up cable whenever said forces do not exceed said predetermined level.

17. The apparatus of claim 16, wherein both of said inertia reels lock against cable pay-out whenever said lateral inertia forces exceed said predetermined level.

18. The apparatus of claim 17, wherein said movement means also includes a track, connected to and surrounding said helmet, said cables being attached to said track in a substantially frictionless manner to insure free head movement.

19. The apparatus of claim 14 wherein said locations are on a seatback positioned behind the crewbember.

20. An apparatus that provides lateral support from lateral inertia forces to the head of a crewmember while in an aircraft, comprising:
   a helmet worn on the head;
   means for laterally attaching said helmet to the aircraft, said attaching means including two cables, one cable being on each side of said helmet, each of said cables being in substantial alignment with the mass center of the head;
   a track, said track connected to the surrounding said helmet, said cables being attached to said track in a substantially frictionless manner to ensure free head movement; and
   at least two spring loaded inertia reels, one reel connected to one of said cables, each of said reels being able to pay-out and take-up cable whenever the forces do not exceed a predetermined level but which lock against cable pay out whenever the lateral inertial forces exceed the predetermined level, said interial reels applying balanced lateral tension to said helmet when the forces exceed the predetermined level.

* * * * *